US009092164B2

(12) United States Patent
Maloney et al.

(10) Patent No.: US 9,092,164 B2
(45) Date of Patent: Jul. 28, 2015

(54) PRINTING USING A PLATFORM-INDEPENDENT DRIVER

(75) Inventors: Shawn E. Maloney, Redmond, WA (US); Justin Hutchings, Issaquah, WA (US); Frank Gorgenyi, Bremerton, WA (US); Joshua A. Dersch, Lynnwood, WA (US); Erik O. Peterson, Kirkland, WA (US); Feng Yue, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 13/149,322

(22) Filed: May 31, 2011

(65) Prior Publication Data

US 2012/0307288 A1  Dec. 6, 2012

(51) Int. Cl.
*G06F 3/12* (2006.01)
*G06F 9/44* (2006.01)

(52) U.S. Cl.
CPC .............. *G06F 3/1203* (2013.01); *G06F 3/122* (2013.01); *G06F 3/1225* (2013.01); *G06F 3/1228* (2013.01); *G06F 3/1288* (2013.01); *G06F 3/1253* (2013.01); *G06F 9/4411* (2013.01)

(58) Field of Classification Search
CPC ... G06F 9/4411; G06F 3/1253; G06F 13/102; G06F 3/1247; G06F 3/1206; G06F 3/1288; G06F 17/211; G06F 3/1205; G06F 3/1228; H04L 41/22
USPC ......... 358/1.15, 1.13, 1.9; 719/324, 327, 329, 719/321; 717/100, 120, 121; 710/8
See application file for complete search history.

(56) References Cited

U.S. PATENT DOCUMENTS

| 6,690,478 B1 | 2/2004 | McIntyre | |
|---|---|---|---|
| 7,136,941 B2 | 11/2006 | Nguyen et al. | |
| 2002/0067498 A1* | 6/2002 | Chapman | 358/1.13 |
| 2003/0093768 A1* | 5/2003 | Suzuki | 717/100 |

(Continued)

FOREIGN PATENT DOCUMENTS

| EP | 1460529 | 9/2004 |
|---|---|---|
| JP | 2009140030 A | 6/2009 |
| JP | 2010009097 A | 1/2010 |

OTHER PUBLICATIONS

"International Search Report", Mailed Date: May 23, 2012, Application No. PCT/US2011/055644, Filed Date: Oct. 10, 2011, pp. 9, (MS# 332439.02).

(Continued)

*Primary Examiner* — Jamares Q Washington
(74) *Attorney, Agent, or Firm* — John Jardine; Kate Drakos; Micky Minhas

(57) ABSTRACT

In one or more embodiments, a print server can publish, to client devices, capabilities and configurations of one or more print devices utilizing a device-independent "personality." Client devices can then use an associated device-independent print driver to select print job settings and record print job content for a particular print job, in a device-independent format, that is then to be sent to the print server. The print server can then process the device-independent format that describes the print job, and convert the print job into a print device-specific format that can be consumed by a particular specific print device. In at least some embodiments, the client device can cause a print job to be printed on a print device, via a print server, without downloading, utilizing or otherwise accessing a print driver that is specific to the print device.

19 Claims, 9 Drawing Sheets

(56) References Cited

U.S. PATENT DOCUMENTS

| | | |
|---|---|---|
| 2003/0231328 A1* | 12/2003 | Chapin et al. ............... 358/1.13 |
| 2006/0146353 A1 | 7/2006 | Yue et al. |
| 2008/0180712 A1 | 7/2008 | Selvaraj |
| 2008/0270525 A1 | 10/2008 | Thero et al. |
| 2009/0063718 A1* | 3/2009 | Sekine et al. ..................... 710/8 |

OTHER PUBLICATIONS

"Konica Minolta's universal printer driver", Retrieved at <<http://www.biz.konicaminolta.com/technologies/upd/>>, Retrieved Date: Mar. 7, 2011, pp. 5.

"Sharing Printers", Retrieved at <<http://windows-xp-full.net/Que-Special.Edition.Using.Micr1/0789732807/ch17Iev1sec12.html>>, Retrieved Date: Mar. 7, 2011, pp. 11.

"Advanced printer configuration and management", Retrieved at <<http://mcseweb.blogspot.com/2010/06/advancedprinter-configuration-and.html>>, Jun. 2, 2010, pp. 13.

"Ahead of Chrome OS Launch, Google Cloud Print Appears Ready to Roll in Beta", Retrieved at <<http://techcrunch.com/2010/12/07/google-cloud-print-beta/>>, Dec. 7, 2010, pp. 4.

"Develop for Mac OS X-The World's Most Advanced Operating System", Retrieved at <<http://developer.apple.com/technologies/mac/, Retrieved Date: Mar. 7, 2011, pp. 2.

"iOS 4.3 Software Update", Retrieved at <<http://www.apple.com/ios/>, Retrieved Date: Mar. 7, 2011, pp. 3.

"Extended European Search Report", EP Application No. 11866600.7, Sep. 29, 2014, 7 pages.

* cited by examiner

PRINTING USING A PLATFORM-INDEPENDENT DRIVER

BACKGROUND

In some print scenarios, such as print sharing scenarios, a print server has access to one or more print devices which can then be shared among multiple client devices. In order to participate in these scenarios, including print sharing scenarios that make use of a shared printer, client devices utilize a print device driver that is specific to a particular print device. The specific print device driver provides information and functionality that enables the client device to present configuration options to the user, and communicate with the print device and have its content printed out on the print device.

Utilizing specific print device drivers can present various challenges and inject a level of complexity in print sharing scenarios, as well as other scenarios. First, given the vast number of printers on the market, the number of associated specific print device drivers is quite large. Thus, some client devices are typically delivered from device manufacturers with a large number of device-specific drivers. In addition, device-specific drivers can be quite large, thus consuming resources on the client device. This complicates the process of managing and distributing device-specific drivers for device manufacturers. Second, in print sharing and other scenarios, client devices utilize driver code that is compiled for their particular architecture. So, for example, if a client device is running a 64-bit version of an operating system, and the print server is running a 32-bit version of an operating system, the client device will be unable to utilize the print server. This makes large scale sharing difficult because print servers have to ensure that they have the proper software for the various supported processor architectures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a print server can publish, to client devices, capabilities and configurations of one or more print devices by utilizing a client device-independent "personality." Client devices can then use an associated device-independent print driver to select print job settings for a particular print job and record print job content, in a device-independent format, that is then to be sent to the print server. The print server can then process the device-independent format that describes the print job, and convert the print job into a print device-specific format that can be consumed by a particular specific print device.

In at least some embodiments, the client device can cause a print job to be printed on a print device, via a print server, without the client device downloading, utilizing or otherwise accessing a print driver that is specific to print device.

BRIEF DESCRIPTION OF THE DRAWINGS

The same numbers are used throughout the drawings to reference like features.

DETAILED DESCRIPTION

Overview

Figure 1:
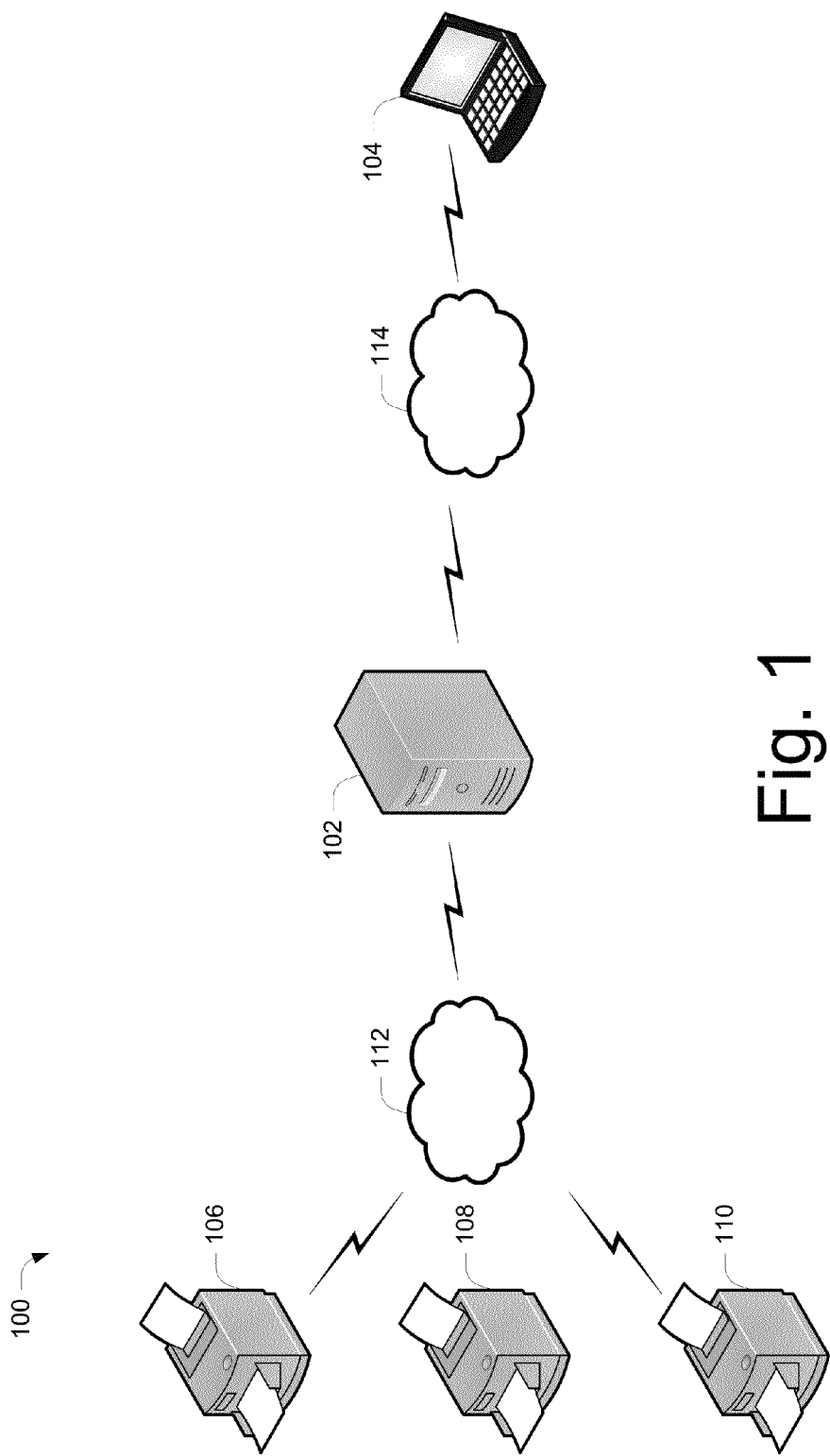
FIG. 1 illustrates an operating environment in which various principles described herein can be employed in accordance with one or more embodiments.

In one or more embodiments, a print server can publish, to client devices, capabilities and configurations of one or more print devices by utilizing a client device-independent "personality." This can be done in an abstract, declarative fashion to facilitate exposure on the client device. Client devices can then use an associated device-independent print driver to select print job settings and record print job content for a particular print job, in a device-independent format, that is then to be sent to the print server. The print server can then process the device-independent format that describes the print job, and convert the print job into a print device-specific format that can be consumed by a particular specific print device.

In at least some embodiments, the client device can cause a print job to be printed on a print device, via a print server, without the client device downloading, utilizing or otherwise accessing a print driver that is specific to print device.

Various embodiments have particular applicability in print sharing scenarios in which a print server enables one or more printers to be shared among different client devices. It is to be appreciated and understood, however, that the inventive embodiments described herein can be employed in scenarios other than print sharing scenarios.

In one or more embodiments, a print server can expose multiple personalities for a particular printer, such as a shared printer. Each personality can have its own associated client software. In at least some embodiments, a first of the personalities can be associated with a print device-specific print driver, and a second of the personalities can be associated with a print device-independent print driver. This can enable client devices to select a particular personality based on current software availability. For example, if a particular client device does not have access to the print device-specific print driver, the client device can then select the print device-independent print driver.

In one or more other embodiments, a user interface module can be utilized to expose, on a client device, characteristics and properties of a specific print device in a manner that enables a print job to be formulated and sent to the print server without the client device downloading, utilizing or otherwise accessing a print driver that is specific to the print device. The print job can be described in a device-independent format that describes both the print content or actual information that is to be printed, as well as the print settings, e.g., staple pages, use A4 paper, print on both sides of the page, and the like.

In the discussion that follows, a section entitled "Operating Environment" is provided and describes one environment in which one or more embodiments can be employed. Next, a section entitled "Exposing One or More Personalities" describes how multiple personalities can be exposed in accordance with one or more embodiments. Following this, a section entitled "Establishing a Connection to a Print Share" describes how a connection can be established to a print share, supported by a print server, in accordance with one or more embodiments. Next, a section entitled "Submitting a Print Job to a Print Server" describes how a print job can be submitted to a print server in accordance with one or more embodiments. Last, a section entitled "Example System" describes an example system that can be utilized to implement one or more embodiments.

Having provided an overview of various embodiments that are to be described below, consider now an example operating environment in which one or more embodiments can be implemented.

Operating Environment

FIG. 1 illustrates an operating environment in accordance with one or more embodiments, generally at 100. Environment 100 includes a computing device 102 in the form of a print server, a client device 104, and one or more print devices examples of which are shown at 106, 108, and 110. The print server 102 communicates with the print devices via a network 112 that can be any suitable type of network such as a wireless or wired network, an intranet, the Internet and the like. Likewise, client device 104 communicates with print server 102 via a network 114 which can be any suitable type of network.

Client device 104 can be embodied as any suitable computing device such as, by way of example and not limitation, a desktop computer, a portable computer, a handheld computer such as a personal digital assistant (PDA), cell phone, and the like.

In operation, as will be described in detail below, the print server 102 can utilize network 114 to publish, to one or more client devices 104, various capabilities and configurations of a particular print device, such as print devices 106, 108, and 110. This can be done in an abstract, declarative fashion— termed a "personality." The client device can then utilize a user interface to expose the capabilities and configurations so that a print job can be formulated. Formulation of the print job can take place, in at least some embodiments, utilizing an associated device-independent print driver. The print driver enables selection of print job settings and recording of print job content for a particular print job, in a device-independent format. This device independent format is then sent to the print server 102. The print server 102 can then process the device-independent format that describes the print job, and convert the print job into a print device-specific format, e.g. a specific page description language (PDL) that can be consumed by a particular specific print device, such as one of devices 106, 108, 110. Alternately or additionally, the print device may consume the device-independent format directly.

In at least some embodiments, the client device 104 can cause a print job to be printed on a specific print device, via the print server 102, without the client device downloading, utilizing or otherwise accessing a print driver that is specific to the print device.

The above-described functionality can be employed in various print scenarios including, by way of example and not limitation, print sharing scenarios as will become apparent below.

Having considered an example operating environment, consider now a discussion of a print server and a client device in accordance with one or more embodiments.

Figure 2:
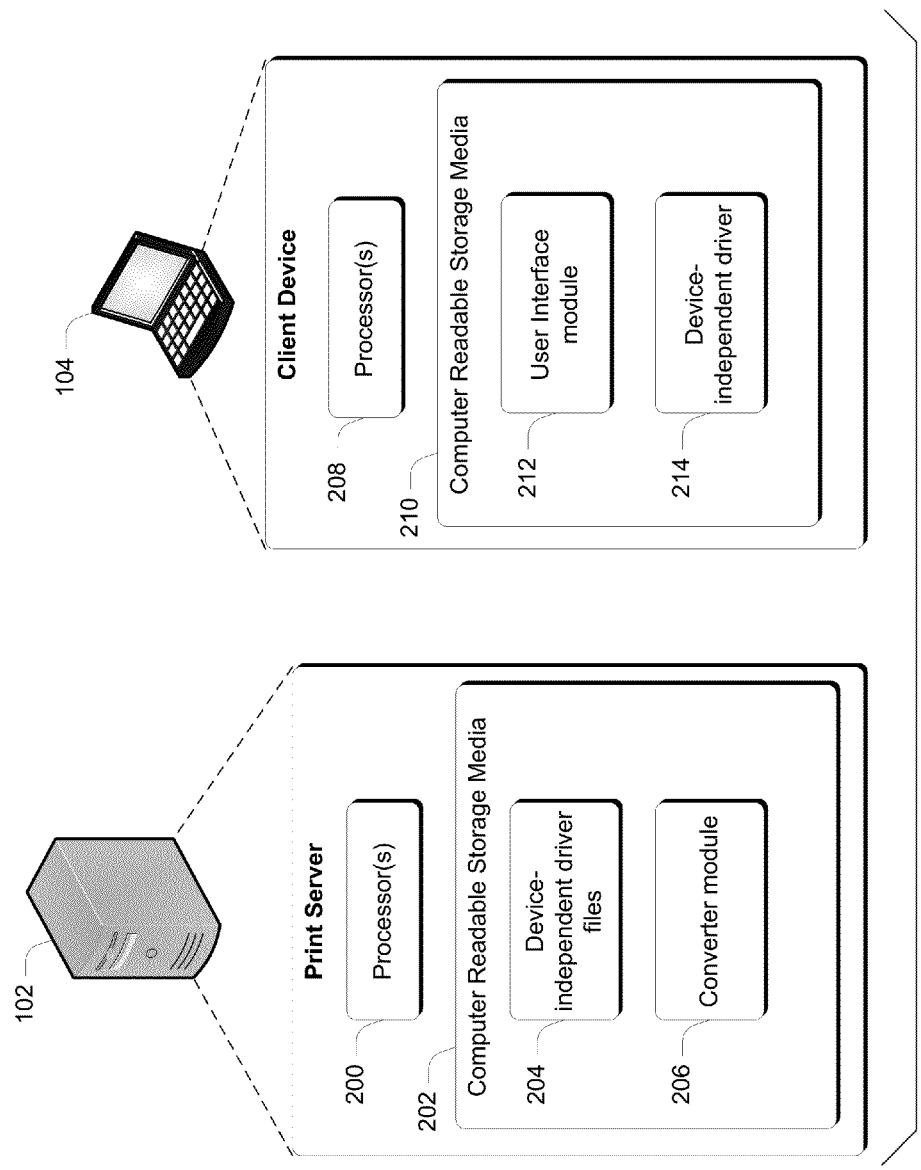
FIG. 2 illustrates an example print server and client device in accordance with one or more embodiments.

Specifically, FIG. 2 illustrates print server 102 and client device 104, in more detail, in accordance with one or more embodiments. In the illustrated and described embodiment, print server 102 includes one or more processors 200, one or more computer-readable storage media 202 and one or more applications or software modules that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device that can serve as a print server is shown and described below in FIG. 9.

The applications or software modules that can reside on the computer readable storage media 202 include, among others, device-independent driver files 204 and converter module 206. The device-independent driver files can be provided to the client device 104 to enable the client device to select print job settings and record print job content for a particular print job in a device-independent format. The print server can then receive the print job in the device-independent format, and utilize converter module 206 to convert the print job into a print device-specific format that can be consumed by a particular specific print device. Alternately, the print device may consume the device-independent format directly.

In the illustrated and described embodiment, client 104 includes one or more processors 208, one or more computer-readable storage media 210 and one or more applications or software modules that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device that can serve as a client device is shown and described below in FIG. 9.

The applications or software modules that can reside on the computer readable storage media 210 include, among others, a user interface module 212 and a device-independent driver 214. The user interface module can be utilized to expose, on the client device, characteristics and properties of a specific print device in a manner that enables a print job to be formulated and sent to the print server without the client device downloading, utilizing or otherwise accessing a print driver that is specific to the print device. The print job can be described in a device-independent format, utilizing device-independent driver 214, that describes both the print content or actual information that is to be printed, as well as the print settings, e.g., staple pages, use A4 paper, print on both sides of the page, and the like.

Having considered an example print server and client device, consider now a discussion of how print server 102 can expose multiple personalities to a client device.

Exposing One or More Personalities

Figure 3:
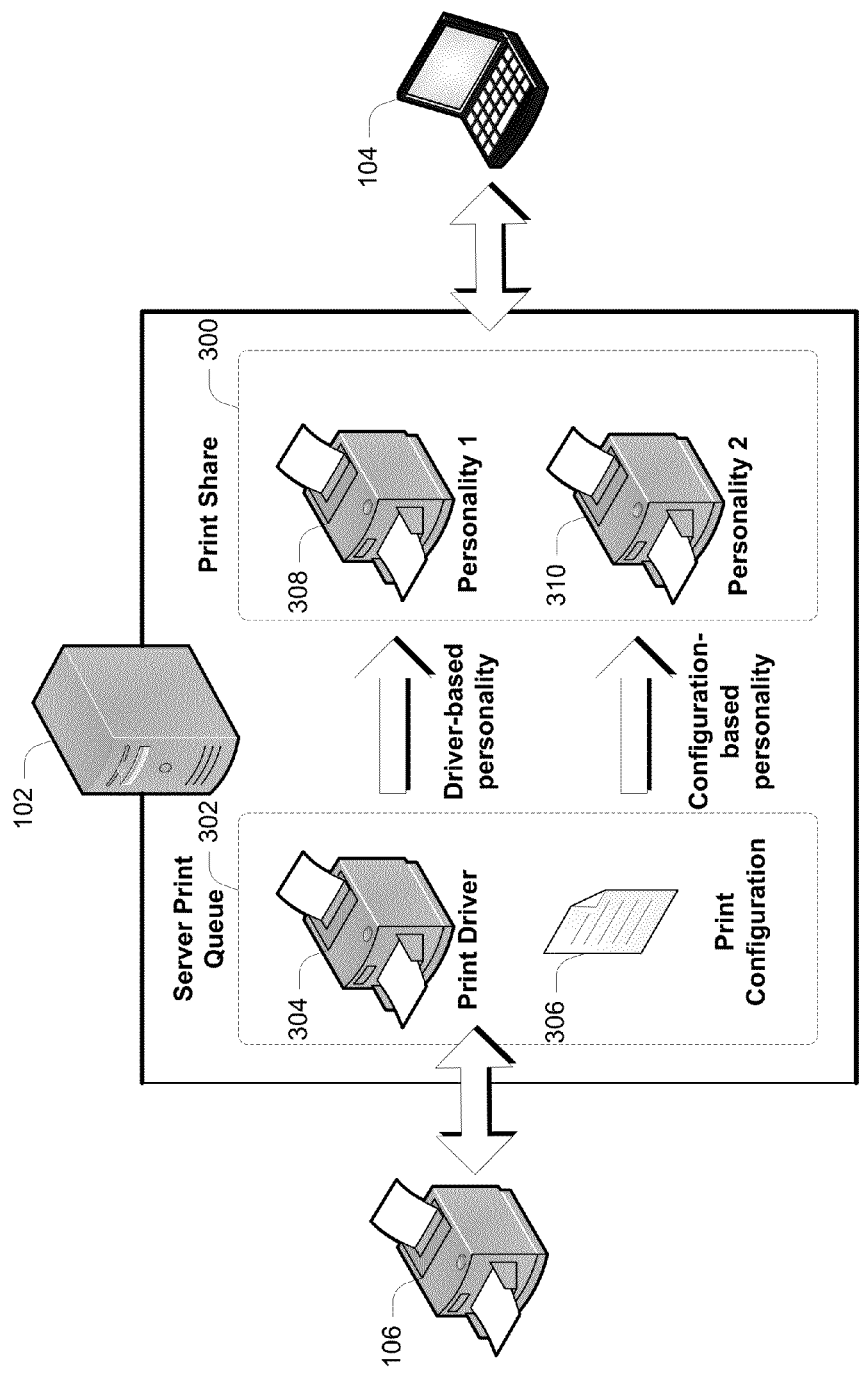
FIG. 3 illustrates a system in which multiple personalities can be exposed in accordance with one or more embodiments.

In one or more embodiments, a print server can expose multiple personalities associated with a particular print device. A personality can be thought of as an abstraction of the capabilities and configuration of a particular print device. The capabilities and configuration of the particular print device refers to both the language in which a particular print job is expressed for a given print device, as well as the properties of a particular print job such as the number of copies, double-sided printing, single-sided printing, and the like. As an example, consider FIG. 3.

There, print server 102, client device 104, and print device 106 are illustrated in accordance with one or more embodiments. In this example, print server 102 encapsulates a print share 300 and a server print queue 302. Print server 102 has a communication channel to print device 106, and client device 104 has a communication channel to print server 102.

Server print queue 302 includes a print driver 304 and print configuration data 306. Print driver 304 comprises software that is specifically tailored to enable print server 102 to provide device-ready data, such as PDL data, that can be printed by print device 106. Print configuration data 306 describes the configuration of the print device 106. In this particular example, print device 106 can be represented as a driver-based personality and a configuration-based personality. The driver-based personality, here represented as personality 308, describes device-specific information associated with driver 304. The configuration-based personality, here represented as personality 310, represents configuration information associated with a device-independent driver. Collectively, personalities 308, 310 represent print share 300.

Using multiple personalities provides client devices with flexibility in how they communicate with the particular print device. Specifically, if a client device has a driver that corresponds with driver 304, then it can elect to process print jobs using that device-specific driver. If, on the other hand, the client device 104 does not have a corresponding device-specific driver and/or is unable to obtain one, it can elect to process print jobs using the device-independent driver associated with personality 310. As such, a client device is able to send print jobs to the print server 102, and cause the print jobs to be printed on print device 106, without necessarily having access to or otherwise using a device-specific driver associated with print device 106.

In addition to facilitating flexibility in client side utilization of the print resources, the configuration-based personality provides an extensibility model in which modifications associated with print device 106 can be exposed to client device 104, without the client having to download any new or special software. For example, the extensibility model can permit administrators to limit access to certain features for particular users or groups. Alternately or additionally, the configuration-based personality can be utilized to articulate changes in a particular device's configuration to the client device 104. Alternately or additionally, changes in a server's capabilities to communicate with a particular print device or changes in a print device's status can be articulated using the configuration-based personality.

Using multiple different personalities, a print server can represent different architectures that might be on a particular client device. So, for example, personalities might be used to represent a 64-bit version of the operating system as well as a 32-bit version of the operating system. This permits large scale sharing and promotes flexibility across different client device architectures.

It is to be appreciated and understood that although two personalities are utilized for purposes of the above-example, more or less personalities can be utilized without departing from the spirit and scope of the claimed subject matter. For example, a personality can be utilized to implement flexible logic that users can utilize to efficiently manage cost for a particular page, print quality, and other parameters. Alternately or additionally, a single personality can be utilized to expose and promote a device-independent driver that, in turn, facilitates ubiquitous printing across a wide variety of environments, including a cloud computing environment.

Once the print server 102 exposes the personality or personalities to the client device 104, the individual client devices can evaluate the available personalities for a particular print share, and select the personality that is appropriate for the client device. This can mitigate situations in which a client device might fail to connect to the print device because it is not able to locate the appropriate device-specific software to communicate with the print share. Specifically, if a particular client device cannot locate or otherwise utilize a device-specific driver, it can fall back and utilize the device-independent driver associated with the configuration-based personality. In doing so, the client device can effectuate printing to the print device 106, through print server 102, independent of and without having access to a device-specific driver. Likewise, the print server 102 can receive and validate the print jobs in a standard exchange format, and convert the standard exchange format into a specific device-ready representation, such as a PDL, that is supported by print device 106.

Figure 4:
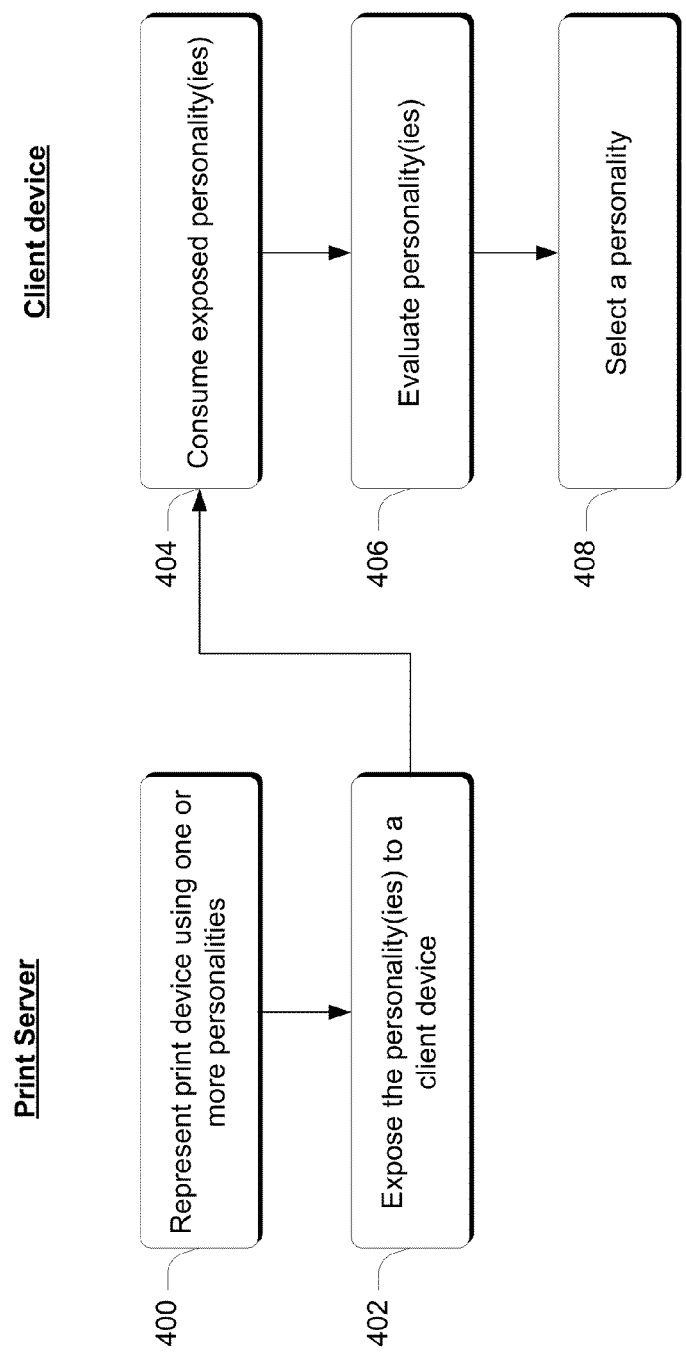
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the method can be implemented by a suitably-configured print server such as that described above and below. In addition, other aspects of the method can be implemented by a suitably-configured client device such as that described above and below. To this end, the illustrated flow diagram contains the designations "Print Server" to represent those steps that can be performed by the print server, and "Client Device" to designate those steps that can be performed by the client device.

Step 400 represents a print device using one or more personalities. This step can be performed in any suitable way. In addition, any suitable type of personality can be utilized, examples of which are given above. In one or more embodiments, a single personality can be represented and can be associated with a device-independent driver that is configured to enable a client device to cause a print device to print a document without the client device having to use a device-specific driver to do so. Alternately or additionally, multiple personalities can be represented. For example, personalities can be represented using key-value pairs in plaintext. Alternately or additionally, personalities can be represented using any suitable language or description including, by way of example and not limitation, PostScript Printer Description file, generic printer description (GPD), and the like. Step 402 exposes the personality(ies) to a client device. The step can be performed in any suitable way. For example, the personality(ies) can be exposed to the client device using the communication channel that is established between the print server and the client device.

Step 404 consumes, on the client device, the exposed personality(ies). This can take place by receiving the representation and processing it for evaluation by the client device. Step 406 evaluates the personality(ies) and step 408 selects a particular personality. Evaluation and selection of a particular personality can take place in any suitable way. For example, a particular client device may not have the resources available to support a device-specific driver. In this case, a personality associated with a device-independent driver can be selected for processing print jobs. On the other hand, if the client device has a device-specific driver, it can opt to use that driver rather than the device-independent driver.

Having considered how a print server can expose multiple personalities to a client device, consider now a discussion of one specific way in which a client device can establish a connection with the print share and become configured to interact with a particular print server.

Establishing a Connection to a Print Share

Figure 5:
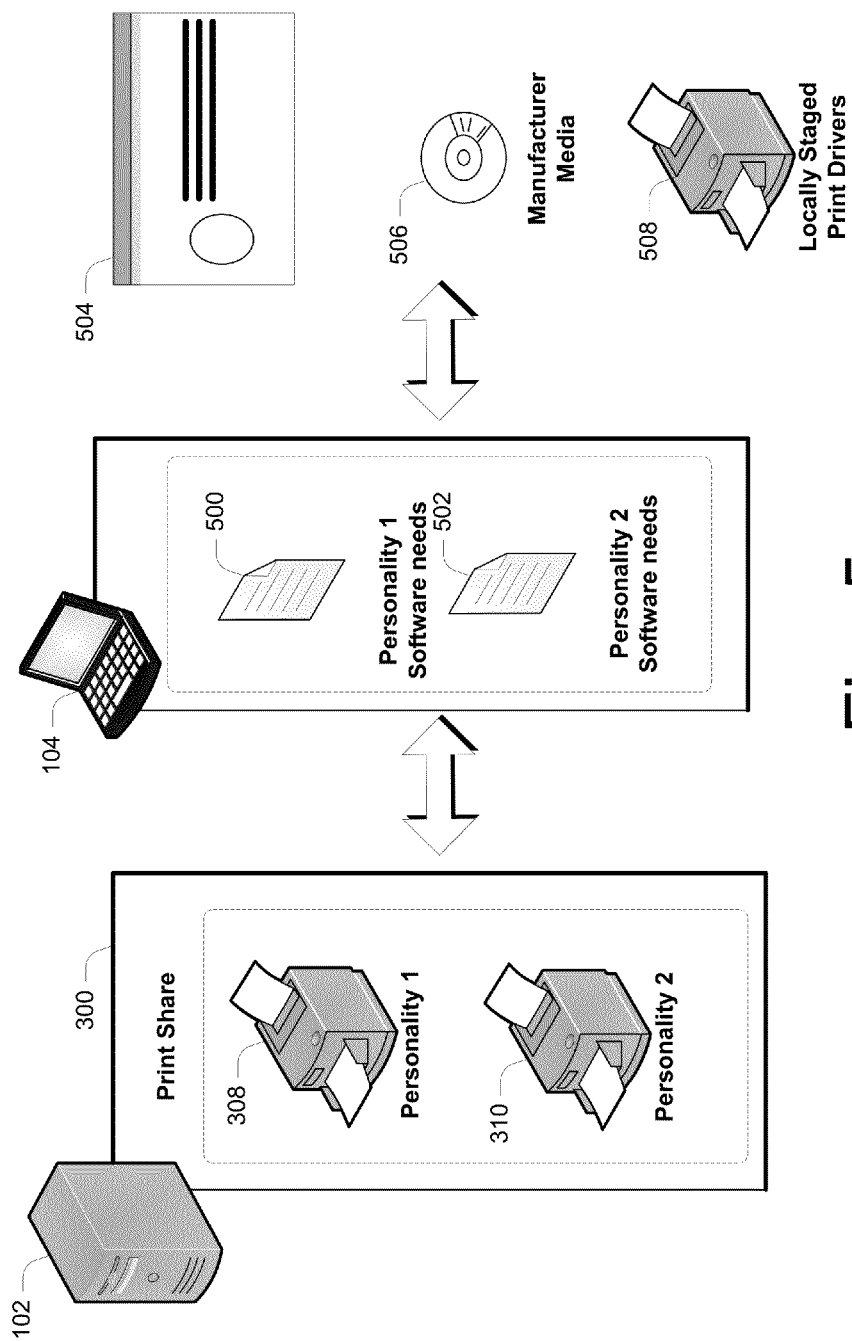
FIG. 5 illustrates a system in which a print connection can be established with a print server in accordance with one or more embodiments.

A client device can establish a connection with a print share in any number ways. In one or more embodiments, a client device can establish a connection with the print share as illustrated in FIG. 5.

There, print server 102 has a print share 300 which, in turn, includes personalities 308, 310 as described above. Each of the personalities includes client software needs that represent software that is utilized in order to interact with a particular print device, whether through device-independent driver or through a device-dependent driver. Here, these software needs are represented at 500, 502. Specifically, software needs 500 are associated with personality 308, and software needs 502 are associated with personality 310.

Software that can be utilized to interact with a particular print device may be available from a number of sources including, by way of example and not limitation, web services 504, manufacturer media 506, and locally available or staged print drivers 508. Print servers can also serve as software sources.

Figure 6:
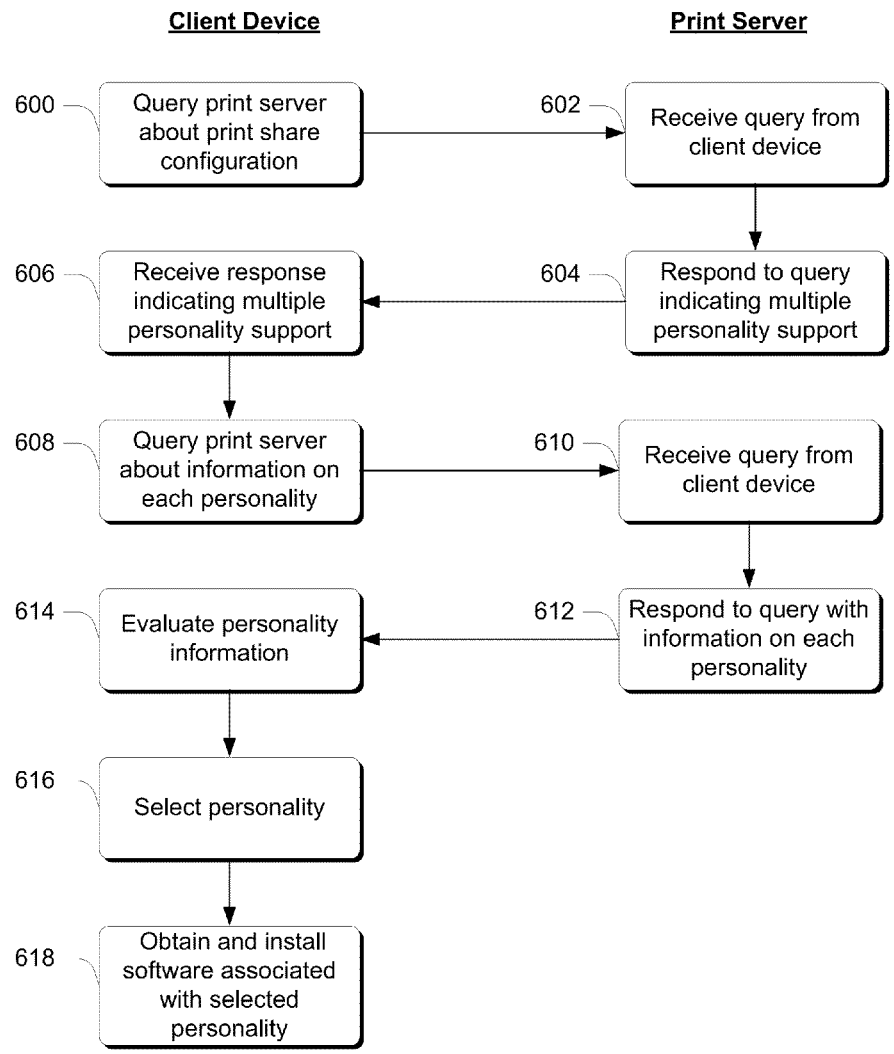
FIG. 6 is a flow diagram that describes steps in a method in accordance with one or more embodiments.

FIG. 6 is a flow diagram that describes steps of a method in accordance with one or more embodiments. The method can be implemented in connection with any suitable hardware, software, firmware, or combination thereof. In at least some embodiments, aspects of the method can be implemented by a suitably-configured print server such as that described above and below. In addition, other aspects of the method can be implemented by a suitably-configured client device such as that described above and below. To this end, the illustrated flow diagram contains the designations "Print Server" to represent those steps that can be performed by the print server, and "Client Device" to designate those steps that can be performed by the client device.

Step 600 queries a print server about print share configuration. Step 602 receives, at the print server, the query from the client device. Step 604 responds to the query indicating support for multiple personalities. Examples of how this can be done are provided above.

Step 606 receives, at the client device, the response from the server indicating multiple personality support. In at least some embodiments, the response can contain information that describes each personality and which software is to be used on the client device to communicate with that particular personality or, more accurately, the print device as represented by the particular personality. In an event that this specific information is not contained in the response, step 608 queries the print server about information on each personality. Again, the purpose of this query is to enable the client device to ascertain which software is to be used on the client device to communicate with that particular personality or, more accurately, the print device as represented by the particular personality. In one or more embodiments, this can occur at various points in time based on changes to the print device. For example, if the print device is out of red ink, black and white printing will be available for printing and the device-independent driver can automatically reconfigure itself.

Step 610 receives, at the print server, the query from the client device. Step 612 responds to the client device with information on each personality. Examples of how this can be done are provided above.

Step 614 evaluates the personality information that is received from the print server. In one or more embodiments, evaluation of the personality information, such as configuration information, can include inventorying available software from various sources such as those described above. Based on its inventory and other assessments, step 616 selects a particular personality and step 618 obtains and installs software associated with a selected personality. This can include obtaining, from a particular source, a device-specific driver. This can also include obtaining, from a particular source such as the print server, a device-independent driver such as the driver described above.

Having described how a connection can be established to a particular print server and its associated print share, consider now a discussion on how a print job can be submitted to the print server in accordance with one or more embodiments.

Submitting a Print Job to a Print Server

Figure 7:
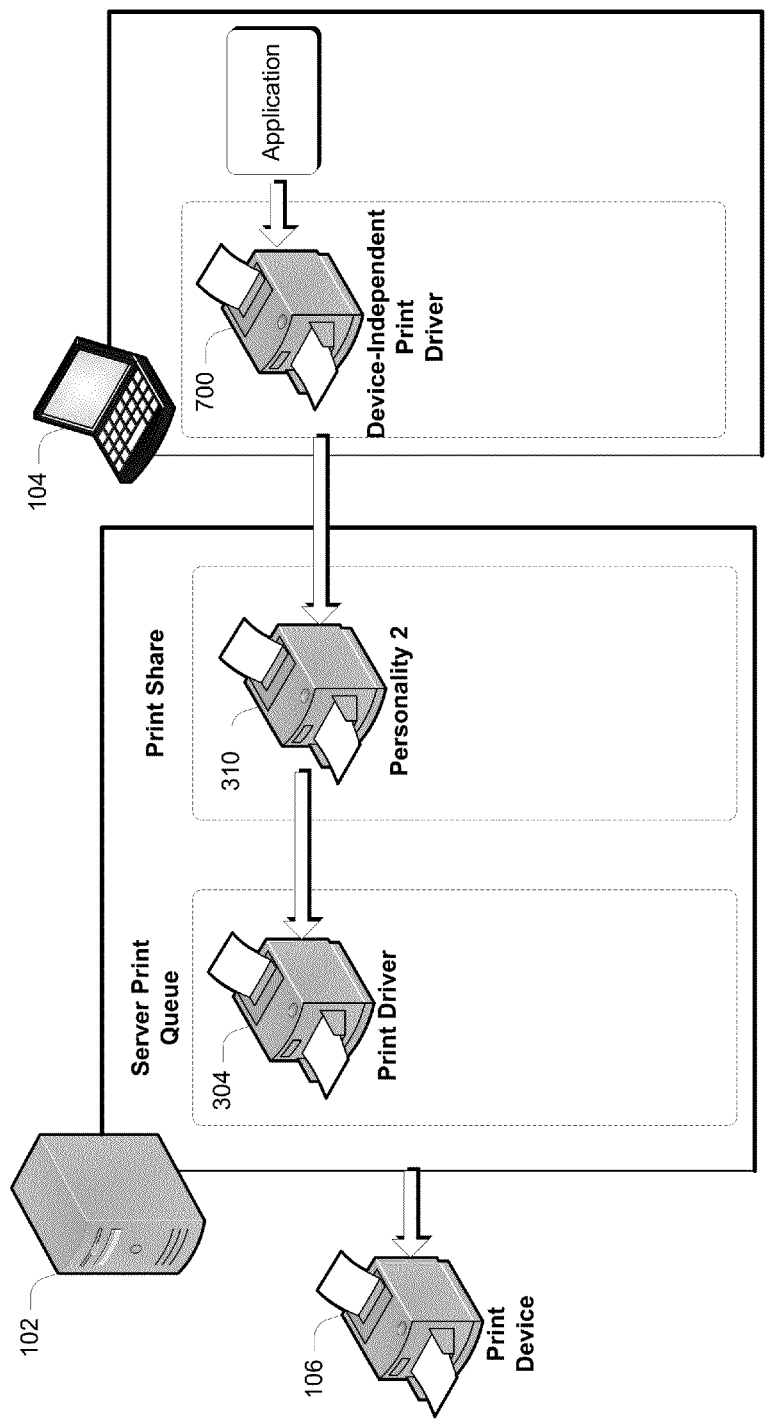
FIG. 7 illustrates a system in which a print job can be sent to a print device, through a print server, in accordance with one or more embodiments.

FIG. 7 illustrates a system such as that described above, where like numerals depict like components. In this particular example, the client device includes device-independent print driver 700 that operates as described above and below, and print server 102 includes a print driver 304 that can render a print job into a device-specific format, as described above and below.

In this example, an application on the client device 104 initiates a print job. In this particular example, the print job gets initiated utilizing device-independent driver 700 which was previously installed when the print connection with the print server 102 was established. The device-independent driver 700 processes the application's print job into a device-independent format. Any suitable device-independent format can be utilized. By way of example and not limitation, the device-independent format can reside in the form of a document that conforms to the Open XML Paper Specification, also referred to as OpenXPS or Microsoft XPS. As will be appreciated by the skilled artisan, OpenXPS is an XML-based (or, more precisely, XAML-based) specification based on a new print path and a color-managed vector-based document format that supports device independence and resolution independence. An OpenXPS document format includes structured markup that defines the layout of the document and the visual appearance of each page, along with rendering rules for distributing, archiving, rendering, processing, and printing documents. It is to be appreciated and understood, however, that any suitable device-independent format can be utilized without departing from the spirit and scope of the claimed subject matter.

The client device 104 then sends the print job and settings, represented in its device-independent format, to the print server 102 for processing. On the print server, the device-independent format is processed into a device-specific page description language using a converter module such as converter module 206 (FIG. 2) and print driver 304. The print job can now be printed by print device 106.

Figure 8:
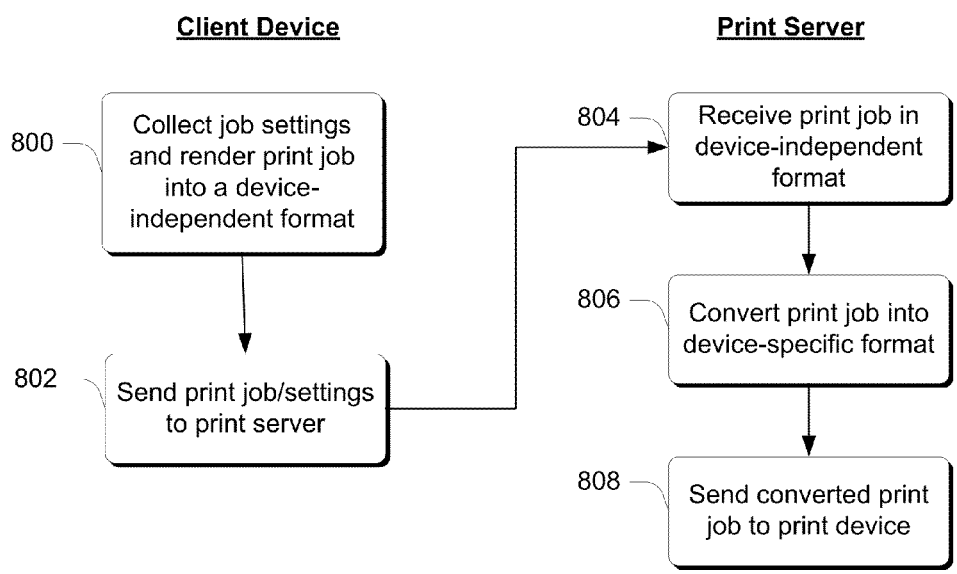
FIG. 8 is a flow diagram that describes steps in a method in accordance with one or more embodiments.

FIG. 8 is a flow diagram that describes steps of a method in accordance with one or more embodiments. The method can be implemented in connection with any suitable hardware, software, firmware, or combination thereof. In at least some embodiments, aspects of the method can be implemented by a suitably-configured print server such as that described above and below. In addition, other aspects of the method can be implemented by a suitably-configured client device such as that described above and below. To this end, the illustrated flow diagram contains the designations "Print Server" to represent those steps that can be performed by the print server, and "Client Device" to designate those steps that can be performed by the client device.

Step 800 collects job settings and renders a print job into a device-independent format. This step can be performed in any suitable way utilizing any suitable device-independent format. In one or more embodiments, the device-independent format comprises OpenXPS. It is to be appreciated and understood, however, that any suitable device-independent format can be utilized without departing from the spirit and scope of the claimed subject matter. Step 802 sends the print job and print settings to a print server.

Step 804 receives the print job in the device-independent format, and step 806 converts the print job into a device-specific format. The step can be performed by utilizing a conversion module which understands the device-independent format, and a device-specific print driver. Step 808 sends the converted print job to the print device. This step can be performed in any suitable way.

Having considered an example in which a print job can be submitted to a print server, consider now to discussion of example system that can be utilized to implement both the print server and the client device.

Example System

Figure 9:
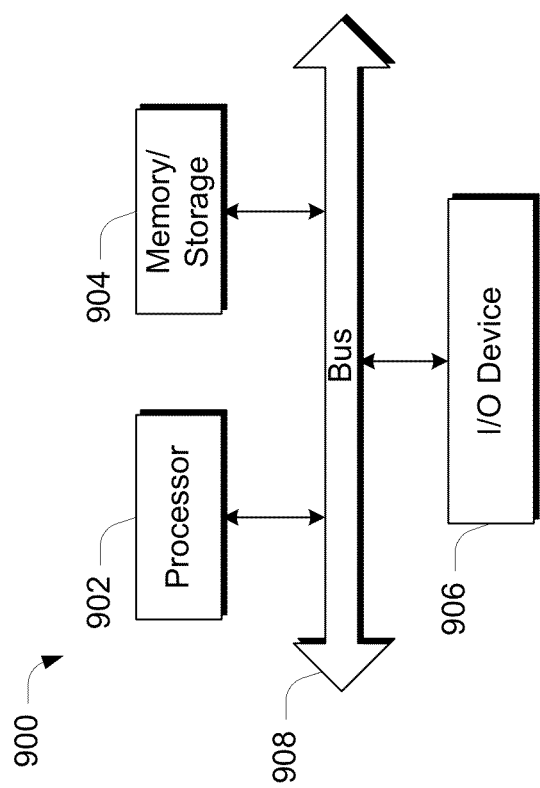
FIG. 9 illustrates an example system that can be utilized to implement one or more embodiments.

FIG. 9 illustrates an example computing device 900 that can be used to implement the various embodiments described above. Components of computing device 900 can be utilized to implement, for example, a print server and/or client device.

Computing device 900 includes one or more processors or processing units 902, one or more memory and/or storage components 904, one or more input/output (I/O) devices 906, and a bus 908 that allows the various components and devices to communicate with one another. Bus 908 represents one or more of any of several types of bus structures, including a memory bus or memory controller, a peripheral bus, an accelerated graphics port, and a processor or local bus using any of a variety of bus architectures. Bus 908 can include wired and/or wireless buses.

Memory/storage component 904 represents one or more computer storage media. Component 904 can include volatile media (such as random access memory (RAM)) and/or non-volatile media (such as read only memory (ROM), Flash memory, optical disks, magnetic disks, and so forth). Component 904 can include fixed media (e.g., RAM, ROM, a fixed hard drive, etc.) as well as removable media (e.g., a Flash memory drive, a removable hard drive, an optical disk, and so forth).

One or more input/output devices 906 allow a user to enter commands and information to computing device 900, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

In the embodiments described above, a print server can publish, to client devices, capabilities and configurations of one or more print devices utilizing a device-independent "personality." Client devices can then use an associated device-independent print driver to select print job settings and record print job content for a particular print job, in a device-independent format, that is then to be sent to the print server. The print server can then process the device-independent format that describes the print job, and convert the print job into a print device-specific format that can be consumed by a particular specific print device.

In at least some embodiments, the client device can cause a print job to be printed on a print device, via a print server, without downloading, utilizing or otherwise accessing a print driver that is specific to print device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
representing a print device using one or more personalities, at least one of which is associated with a device-independent driver that is configured to enable a client device to cause a print device to print a document without the client device having to use a device-specific driver, a personality comprising an abstraction of a language in which a particular print job is expressed for the print device and properties available for the particular print job; and
determining whether the client device has a device-specific driver that corresponds to the print device, wherein in response to determining that the client device has a device-specific driver that corresponds to the print device the method further comprises selecting a personality of the multiple personalities that corresponds to the device-specific driver effective to enable the client device to cause printing utilizing software associated with the selected personality, and in response to determining that the client device does not have a device-specific driver that corresponds to the print device the method further comprises selecting a personality of the multiple personalities that corresponds to a device-independent driver effective to enable the client device to cause printing utilizing software associated with the selected personality.

2. The computer-implemented method of claim 1, wherein said representing comprises representing the print device using at least one additional personality.

3. The computer-implemented method of claim 2, wherein the at least one additional personality is associated with a print device-specific driver.

4. The computer-implemented method of claim 1, wherein said representing and determining are performed by a print server.

5. The computer-implemented method of claim 1 further comprising receiving, from the client device, a print job in a device-independent format associated with the device-independent driver.

6. The computer-implemented method of claim 5, wherein the device-independent format comprises OpenXPS.

7. The computer-implemented method of claim 5, further comprising converting the print job into a device-specific format.

8. The computer-implemented method of claim 5, further comprising converting the print job into a device-specific format and sending a converted print job to a print device for printing.

9. A client device comprising:
one or more processors;
one or more computer-readable storage memories, associated with the one or more processors and embodying computer-readable instructions which, when executed, cause the client device to perform a method comprising:
    querying, by the client device, a print server about a print share configuration;
    receiving, at the client device, a response from the print server indicating multiple personality support associated with a print device, at least one of the multiple personalities being associated with a device-independent driver that is configured to enable the client device to cause an associated print device to print without the client device having to use a device-specific driver, a personality comprising an abstraction of a language in which a particular print job is expressed for the print device and properties available for the particular print job;
    evaluating, at the client device, information associated with the multiple personalities; and
    determining, at the client device, whether the client device has a device-specific driver that corresponds to the print device, wherein in response to determining that the client device has a device-specific driver that corresponds to the print device the method further comprises selecting a personality of the multiple personalities that corresponds to the device-specific driver effective to enable the client device to cause printing utilizing software associated with the selected personality, and in response to determining that the client device does not have a device-specific driver that corresponds to the print device the method further comprises selecting a personality of the multiple personalities that corresponds to a device-independent driver effective to enable the client device to cause printing utilizing software associated with the selected personality.

10. The client device of claim 9, wherein the method further comprises obtaining and installing software associated with the selected personality.

11. The client device of claim 10, wherein the obtaining comprises obtaining a print device-independent driver.

12. The client device of claim 9, wherein the method further comprises rendering a print job into a device-independent format using the device-independent driver.

13. The client device of claim 12, wherein the device-independent format comprises OpenXPS.

14. A print server comprising:
one or more processors;
one or more computer-readable storage media, associated with the one or more processors and embodying computer-readable instructions which, when executed, cause the print server to perform a method comprising:
    representing a print device, to a client device, using multiple personalities, at least one of which is associated with a device-independent driver that is configured to enable the client device to cause the print device to print a document without the client device having to use a device-specific driver to print the document, a personality comprising an abstraction of a language in which a particular print job is expressed for the print device and properties available for the particular print job; and
    responsive to a determination that the client device has a device-specific driver that corresponds to the print device, enabling the client device to cause printing utilizing software associated with a personality corresponding to the device-specific driver, and responsive to a determination that the client device does not have a device-specific driver that corresponds to the print device, enabling the client device to cause printing utilizing software associated with a personality corresponding to a device-independent driver.

15. The server of claim 14, wherein the device-independent format comprises OpenXPS.

16. The server of claim 14, wherein at least one other of the multiple personalities is associated with a device-specific driver.

17. The server of claim 14, wherein said print server being configured to represent the print device comprises being configured to represent the print device using at least one additional personality.

18. The server of claim 17, wherein the at least one additional personality is associated with a print device-specific driver.

19. The server of claim 14, wherein the method further comprises receiving, from a client device, a print job in a device independent format; converting the print job into a device-specific format; and sending a converted print job to the print device for printing.

* * * * *